Figure 1:
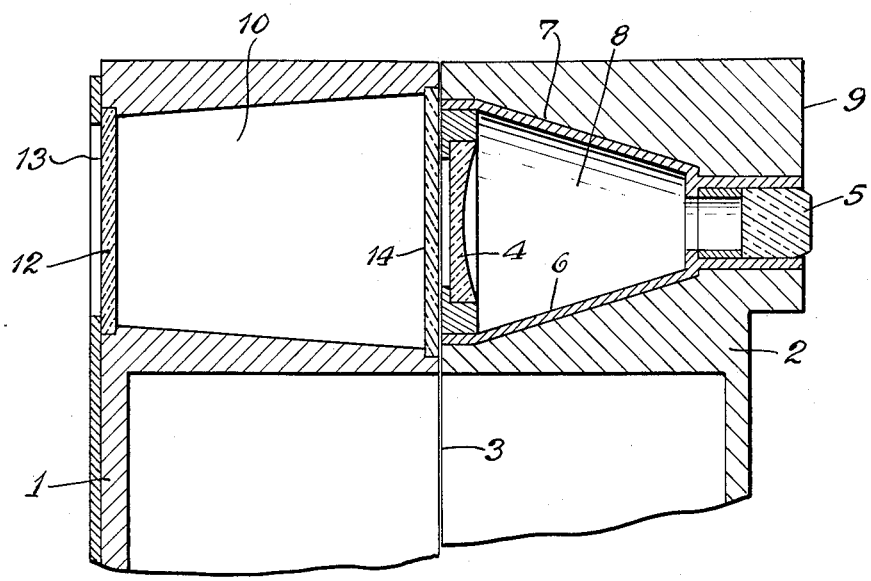

Aug. 16, 1955   R. TAESLER   2,715,351
VIEWFINDER IN A CAMERA CASING
Filed July 3, 1952

Inventor
Rudolf Taesler
by Singer, Stern & Carlberg
Attorneys

United States Patent Office 2,715,351
Patented Aug. 16, 1955

2,715,351

VIEWFINDER IN A CAMERA CASING

Rudolf Taesler, Stuttgart, Germany, assignor to Zeiss Ikon A. G., Stuttgart, Stuttgart, Germany Application July 3, 1952, Serial No. 297,073

Claims priority, application Germany July 7, 1951

4 Claims. (Cl. 88—1.5)

The invention relates to improvements in motion picture cameras and particularly is directed to a novel arrangement of the finder in the casing of a motion picture camera.

It is an object of the invention to provide a motion picture camera casing which, for the purpose of opening it to load it with motion picture film, is divided into two parts, with a finder and arrange the entire optical system of this finder in one of the two parts of the camera casing.

Another object of the invention is to mount the optical system of the finder in the form of a complete assembly in one of the two parts of the camera casing.

Motion picture cameras are known in which the camera casing is divided into two parts for opening it. The plane of division of the casing is arranged in such a manner that it passes transversely through the optical axis of the finder and passes through the finder itself. In such a construction the elements of the finder are mounted in different parts of the camera casing. Since the parts of the finder have to be very accurately centered, the accuracy of the finder depends upon an accurate fitting of the meeting edges on two parts of the camera casing, but such accurate fitting is difficult to accomplish, at least when the extreme accuracy is considered with which optical finders have to be assembled.

It is unavoidable that during the opening of the camera casing, for instance, when a film has to be exchanged, foreign bodies enter the finder, which foreign bodies can only be removed after the film has run completely through the camera, as otherwise the film would be ruined by the exposure to light entering the camera when the casing is opened to remove the foreign bodies.

It is therefore also an object of the invention to overcome these disadvantages of certain conventional motion picture cameras. This is attained by arranging in a divided camera casing having a finder assembly with a finder shaft which is divided transversely to the finder axis the entire finder assembly in such a manner that the optical system of the finder assembly is mounted as an integral unit into one of the two camera casing parts. When the camera casing is opened the optical system of the finder will be in one part of the casing and no dust or other dirt can enter the finder and can deposit therein. Furthermore, the adjustment of the finder is easier and can be accomplished with greater accuracy.

Until now it was customary in divided camera casings to arrange the picture framing marks directly adjacent the finder lens of a reversed Galilean telescope. Since these picture framing marks can only be seen sharply at a certain distance from the lens, it is also an object of the invention to arrange these picture framing marks for the purpose of viewing them clearly and sharply to mount the same, in a finder constructed as Galilean telescope, in one part of the divided camera casing, while the other optical system of the finder is mounted in the other part of the casing. The optical system of the finder is preferably mounted in the rear part of the camera casing and the picture framing marks on the front part of the camera casing, preferably in the plane of the front wall of the casing, so that the picture framing marks are arranged at the greatest possible distance from the finder lens.

The arrangement of the optical system of the finder in the rear part of the camera casing has the advantage that the finder shaft in the front part of the casing serves also as a lens hood for the finder lens so that no extra hood is necessary.

It is another object of the invention to cover the openings of the divided finder shaft particularly the division gap, with optical ineffective transparent material so that when the camera casing is opened there are no hollow spaces which are open toward the exterior.

The arrangement of the finder of the present invention is particularly suitable for motion picture cameras in which the film spool axes are arranged on both sides of the path of the film travel and the picture window and parallel to the optical axis.

The above objects and others will be apparent from the following detailed description of a preferred embodiment of the invention such as shown in the accompanying drawing, in which—

Figure 2:
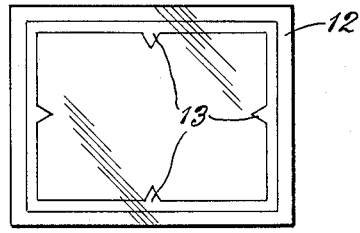

Figure 1 is a portion of a sectional view of a camera and illustrates the arrangement of the finder in the two parts of the camera casing, and Figure 2 is a front view of the glass plate provided with picture framing marks.

Referring to the drawing, Figure 1 illustrates a camera casing comprising two separate parts 1 and 2 which are closed at a joint 3. The rear part 2 of the casing has mounted therein the optical system of the finder comprising a finder lens 4 and an ocular lens 5. These lenses 4 and 5 may be separately mounted, but preferably are secured in a mount 6 forming the rear half of the finder shaft 8 which is inserted in a suitable aperture 7 in the rear part 2 of the camera casing so that the finder lens 4 comes to lie approximately in the plane of the joint 3. The ocular lens 5 of the finder is mounted to be positioned adjacent the rear wall 9 of the rear part 2 of the camera casing. The front half 10 of the finder shaft is arranged in the front part 1 of the camera casing and the front end of the shaft is closed by a glass plate 12 having attached thereto picture framing marks 13 as shown in Figure 2. While Figure 2 shows a rectangular glass plate 12 with a rectangular picture framing mark, it is obvious, that the rectangular picture framing mark 13 may also be applied to a circular glass plate. The rear end of the finder shaft portion 10 in the front part of the camera casing is closed by a clear glass plate 14.

The optical system of the finder consisting of the finder lens 4, the mount 6 and the ocular lens 5 may be inserted as a complete assembly or unit into the rear part 2 of the camera casing.

What I claim is:

1. In a motion picture camera, a casing consisting of a front part and a rear part adapted to permit access to the interior of the casing for exchanging of film, a joint being formed where said front and rear parts meet each other when the casing is closed, a finder mounted in said casing and having a finder shaft extending through both said casing parts, said finder including an optical system mounted in said rear part in such a manner that the optical axis of said system intersects the plane in which said joint is arranged, said optical system comprising a mount, a finder lens and an ocular lens, said optical system being mounted as an assembled unit into the rear part of said camera casing.

2. In a motion picture camera, a casing consisting of a front part and a rear part adapted to permit access to the interior of the casing for exchanging of film, a joint being formed where said front and rear parts meet each other when the casing is closed, a finder mounted in said casing and having a finder shaft extending through both said casing parts, said finder including an optical system mounted in said rear part in such a manner that the optical axis of said system intersects the plane in which said joint is arranged, the front part of said camera casing containing the front half of said finder shaft, a clear plate closing the rear end of the front half of said finder shaft, and a glass plate having picture framing marks thereon closing the front end of said front half of said finder shaft.

3. In a motion picture camera, a casing consisting of a front part and a rear part adapted to permit access to the interior of the casing for exchanging of film, a joint being formed where said front and rear parts meet each other when the casing is closed, a finder mounted in said casing and having a finder shaft extending through both said casing parts, said finder including an optical system mounted in said rear part in such a manner that the optical axis of said system intersects the plane in which said joint is arranged, said optical system including a finder lens and axially spaced therefrom an ocular lens, said rear part of the camera casing having a rear wall, said ocular lens being mounted in said rear wall.

4. In a motion picture camera, a casing consisting of a front part and a rear part adapted to permit access to the interior of the casing for exchanging of film, a joint being formed where said front and rear parts meet each other when the casing is closed, a finder mounted in said casing and having a finder shaft extending through both said casing parts, said finder including an optical system mounted in said rear part in such a manner that the optical axis of said system intersects the plane in which said joint is arranged, said optical system including a finder lens and axially spaced therefrom an ocular lens, said rear part of the camera casing having a rear wall, said ocular lens being mounted in said rear wall, the front part of the camera casing having a front wall, and a glass plate mounted in said front wall and closing the front end of said finder shaft, said glass plate having picture framing marks thereon.

References Cited in the file of this patent

UNITED STATES PATENTS

| | | |
|---|---|---|
| 2,013,288 | Porter | Sept. 3, 1935 |
| 2,043,900 | Mihalyi | June 9, 1936 |
| 2,208,797 | Kende | July 23, 1940 |
| 2,487,773 | Schwartz et al. | Nov. 8, 1949 |
| 2,554,333 | Kaplowitz | May 22, 1951 |
| 2,584,373 | Thompson | Feb. 5, 1952 |